Oct. 9, 1923.
S. L. BARLOUGH
1,469,984
REVERSING DEVICE FOR MOTOR CYCLES
Filed Nov. 19, 1921
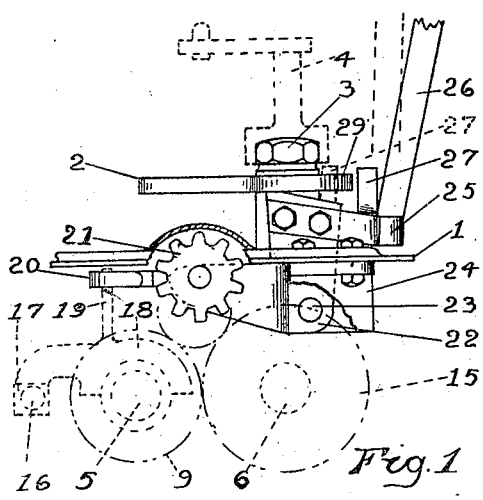
Fig. 1
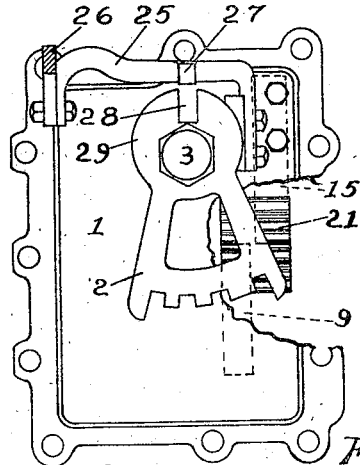
Fig. 2
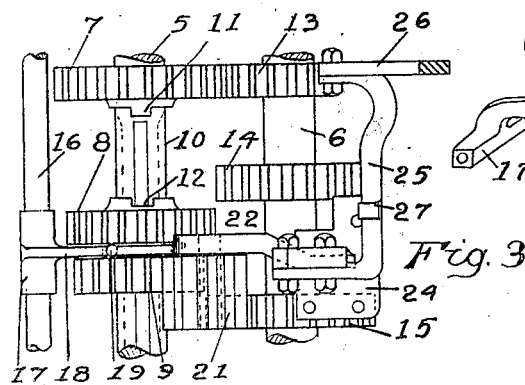
Fig. 3
Fig. 9
Fig. 5
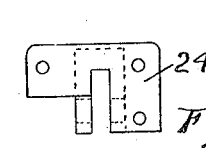
Fig. 8
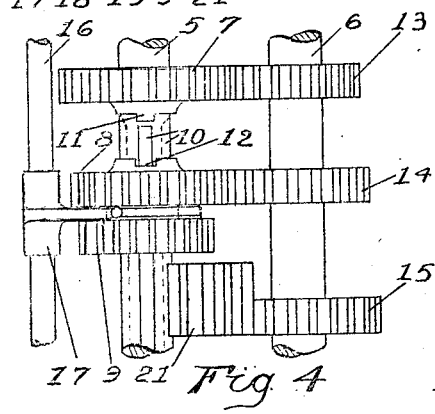
Fig. 4
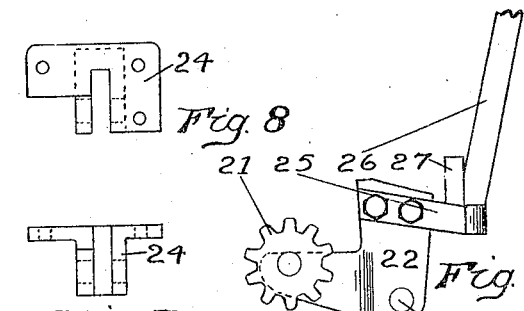
Fig. 7
Fig. 6
Stephen L. Barlough
INVENTOR
BY
Geo. B. Willis
ATTORNEY Patented Oct. 9, 1923.

1,469,984

UNITED STATES PATENT OFFICE.

STEPHEN L. BARLOUGH, OF SAGINAW, MICHIGAN.

REVERSING DEVICE FOR MOTOR CYCLES.

Application filed November 19, 1921. Serial No. 516,338.

*To all whom it may concern:*

Be it known that I, STEPHEN L. BARLOUGH, a citizen of the United States, residing at Saginaw, in the county of Saginaw and State of Michigan, have invented certain new and useful Improvements in Reversing Devices for Motor Cycles; and I do hereby declare the following to be a full, clear, and exact description of the invention, such as will enable others skilled in the art to which it appertains to make and use the same.

This invention relates to transmission gears of motor cycles and the like and pertains more particularly to an improved construction of transmission gear whereby the motor cycle may be easily and quickly moved backward as well as forward, under its own power.

It has heretofore been customary to so construct the transmission mechanism of motor cycles that they can be driven ahead at various speeds, or set in neutral position, but no provision has usually been made for enabling the motor cycle to be backed under its own power.

My invention more specifically pertains to an improved device that can be easily applied to existing motor cycles whereby the machine may be capable of reversing, and furthermore I provide means to prevent the mechanism being put into reverse position when the gears have been shifted out of neutral, and I also provide means for preventing the shifting of the gears from high to low, when the reversing mechanism is in gear.

With the foregoing and certain other objects in view, which will appear later in the specification, my invention comprises the devices described and claimed, and the equivalents thereof.

In the drawings, Fig. 1 is a side elevation, broken away in part, showing a motor cycle gear case cover with my improvement attached thereto.

Fig. 2 is a top plan view, showing the outer face of the gear case cover partly broken away.

Fig. 3 is a plan view of the gears arranged in backing position.

Fig. 4 is a similar view showing the gears in neutral position.

Fig. 5 is a detached plan view of the reversing idler gear and the bar upon which the gear is mounted.

Fig. 6 is a side view of the parts shown in Fig. 5.

Figs. 7 and 8 are respectively rear and top plan views of the bracket that supports the reversing lever and gear shown in Fig. 5.

Fig. 9 is a diagrammatic view in perspective, showing the usual gear-shifting mechanism of a motor cycle.

As is clearly shown in the drawings, a gear-shifting mechanism of usual construction, to which my invention may be applied, consists in the cover 1 of the gear case, this cover carrying a niched quadrant 2 adapted to lock the gear-shift mechanism in high, low, or neutral position. The quadrant 2 is carried by quadrant shaft 3 mounted in a suitable bearing in the cover 1. The shaft 3 and the quadrant 2 are usually actuated by a suitable quadrant shaft lever 4, indicated by dotted lines in Fig. 1.

Within the gear case, not shown, is the usual drive shaft 5 connected to the engine, and the usual driven shaft 6 connected to the rear wheel of the motor cycle.

The drive shaft 5 carries an idle gear 7 and a pair of slidable gears 8 and 9 formed integral and feathered, the feathers slidable in keyways 10 formed in the shaft 5.

One end of the hub of gear 7 is provided with a clutch member 11 and a corresponding clutch member 12 is provided on the end of the hub of gear 8. Since gear 8 revolves with shaft 5 and gear 7 is idle, when the clutch 11, 12 is closed, gear 8 will drive gears 7 and 13, and shaft 6.

Gear 13 is fixed to shaft 6, as also are gears 14 and 15.

A stationary guide bar 16 is provided, upon which is a slidable hub 17 carrying a yoke 18 which engages the hub between the integral gears 8 and 9. A rod or pin 19 projects upwardly from yoke 18 and is engaged by a hooked arm 20 carried by the quadrant shaft 3, so that when quadrant 2 is moved to the right or to the left, the gears 8 and 9 are correspondingly shifted by the yoke 18.

The foregoing is a description of a usual type of motor cycle transmission gearing, and it is to such a change speed gear mechanism, or its equivalent, that my improvement is adapted to be applied.

In applying my improvement, I provide an idler gear 21 of substantially double the width of gears 9 or 15 and preferably movably mounted above said gears, as shown in Figs. 1 and 3. The gear 21 is preferably mounted on an L-shaped rocker arm 22, which is pivoted at 23 to a bracket 24 carried by the cover 1 of the gear case. A bent bar 25 is secured to the upper end of bracket 22 and may extend across the outer face of the gear case cover, as shown in Fig. 2. Bar 25 carries at its free end an operating lever 26, by the manipulation of which the gear 21 may be raised or lowered and thrown into or out of mesh with gear 15 or with gear 9 when the latter is shifted—by means of yoke 18 and quadrant shaft lever 4 so as to be engaged by the other half of gear 21. When gear 21 is in operation, the driven shaft 6 rotates in the opposite direction and the motor cycle runs backward.

27 is a lug carried by bar 25, and 28 is a niche formed in a flange 29 provided on the hub of quadrant 2, as shown in Fig. 2.

The lug 27 when in engagement with the niche 28, holds quadrant 2 against turning. The laterally projecting flange 29 prevents manipulation of lever 26 and the engagement of gear 21 with gears 15 and 9, except when the quadrant 2 is in such position that lug 27 can enter the niche 28. This engaging position of gear 21 corresponds to the neutral position of the gears on shafts 5 and 6. It is thereby rendered impossible for lever 26 to be manipulated to throw gear 21 into engagement so as to back the motor cycle, except when the transmission gears are in their inoperative or neutral position.

The gears 8 and 9 can not be shifted from their high speed position to their low speed position, except when gear 21 is raised and, therefore, out of mesh.

By the means above described it is rendered impossible for the driver to back the motor cycle under its own power, except when the transmission gears are in their neutral position.

By the devices and combination of parts above described, and their equivalents, as included in the scope of the claim, I have produced a simple and effective reversing device that can be readily applied to existing forms of motor cycles, the necessary part being adapted to be carried by the usual cover of the motor cycle gear case. My improvement, therefore, makes it possible for a standard motor cycle change-speed mechanism to be easily and quickly converted to enable the motor cycle to travel backward on its own power, and such alteration of the change-speed device may be accomplished by merely removing the gear case cover and substituting for it another cover carrying the gear 21 and its operating lever.

When applied to motor cycles in process of manufacture, my improvement may be easily applied to the gear case cover without redesigning or materially altering the usual change-speed gear arrangement as heretofore applied to motor cycles that were not reversible.

Having thus described my invention, what I claim and desire to secure by Letters Patent is:

In a motor cycle, in combination, a gear case, a removable gear case cover, a gear-shift mechanism in said case including an idle reversing gear, a bracket secured to the inner face of said cover, an arm pivoted to said bracket, a bent lever fixed to said arm and projecting through said cover, a gear-shift quadrant and a latching means adapted to releasably engage said lever and quadrant, for the purposes set forth.

In testimony whereof, I affix my signature.

STEPHEN L. BARLOUGH.